(12) United States Patent
An et al.

(10) Patent No.: US 11,748,860 B2
(45) Date of Patent: Sep. 5, 2023

(54) SYSTEMS AND METHODS FOR NEW ROAD DETERMINATION

(71) Applicant: BEIJING DIDI INFINITY TECHNOLOGY AND DEVELOPMENT CO., LTD., Beijing (CN)

(72) Inventors: Kaiqiang An, Beijing (CN); Maozong Zheng, Beijing (CN); Mengxi Li, Beijing (CN); Xiang Wen, Beijing (CN); Pengfei Xu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 620 days.

(21) Appl. No.: 16/858,634

(22) Filed: Apr. 26, 2020

(65) Prior Publication Data

US 2020/0263998 A1 Aug. 20, 2020

Related U.S. Application Data

(63) Continuation of application No. PCT/CN2017/109252, filed on Nov. 3, 2017.

(51) Int. Cl.
*G06T 5/30* (2006.01)
*G06T 7/90* (2017.01)
(Continued)

(52) U.S. Cl.
CPC ............ *G06T 5/30* (2013.01); *G01C 21/3415* (2013.01); *G06T 7/90* (2017.01); *G08G 1/0133* (2013.01);
(Continued)

(58) Field of Classification Search
CPC .................. G01C 21/3415; G06T 7/90; G06T 2207/30236; G06T 2207/30241;
(Continued)

(56) References Cited

U.S. PATENT DOCUMENTS 8,359,156 B2 1/2013 Guo et al.
8,606,011 B1 12/2013 Ivanchenko et al.
(Continued)

FOREIGN PATENT DOCUMENTS

CN 104165630 11/2014
CN 104677363 6/2015
(Continued)

OTHER PUBLICATIONS

Hailing Zhou, Hui Kong, Lei Wei and Saeid Nahavandi; "On Detecting Road Regions in a Single UAV Image"; (2017); IEEE; IEEE Transactions on Intelligent Transportation Systems, vol. 18, No. 7, pp. 1715-1716 (Year: 2017).*
(Continued)

*Primary Examiner* — Aniss Chad
*Assistant Examiner* — Chase L Cooley
(74) *Attorney, Agent, or Firm* — METIS IP LLC

(57) ABSTRACT

The present disclosure relates to systems and methods for identifying one or more target roads. The systems may perform the methods to obtain a heat map associated with a plurality of driving track points along a plurality of roads in a target region, wherein the plurality of roads includes one or more target roads and one or more reference roads; obtain a road network map associated with the one or more reference roads in the target region; produce an intermediate heat map by: eliminating pixels in the heat map corresponding to the one or more reference roads in the road network map, eliminating background pixels corresponding to background of the heat map, and thinning the heat map; and
(Continued)

determine start coordinate information and end coordinate information associated with the one or more target roads based on the intermediate heat map according to a linear transformation.

20 Claims, 10 Drawing Sheets

(51) Int. Cl.
    *G01C 21/34*     (2006.01)
    *G08G 1/01*     (2006.01)
(52) U.S. Cl.
    CPC ......... *G08G 1/0141* (2013.01); *G08G 1/0145* (2013.01)
(58) Field of Classification Search
    CPC ... G06T 2207/30256; G06T 5/50; G06T 5/30; G06T 5/003; G06V 10/48; G08G 1/0133; G08G 1/0141; G08G 1/0145
    See application file for complete search history.

(56) References Cited

U.S. PATENT DOCUMENTS

| | | | |
|---|---|---|---|
| 9,212,919 | B2 | 12/2015 | Kanematsu |
| 2002/0004701 | A1 | 1/2002 | Nakano |
| 2010/0266161 | A1 | 10/2010 | Kmiecik et al. |
| 2012/0078493 | A1 | 3/2012 | Schunder et al. |
| 2014/0074847 | A1* | 3/2014 | Martens ................ G01C 21/26 707/740 |
| 2015/0285639 | A1 | 10/2015 | Basalamah et al. |
| 2016/0238396 | A1 | 8/2016 | Mund |
| 2016/0239983 | A1* | 8/2016 | Dorum ................ G06V 20/182 |

FOREIGN PATENT DOCUMENTS

| | | | |
|---|---|---|---|
| CN | 104751153 | | 7/2015 |
| CN | 105258704 | | 1/2016 |
| CN | 105528603 | | 4/2016 |
| CN | 105575254 | | 5/2016 |
| CN | 106767870 | | 5/2017 |
| CN | 105258704 B | * | 12/2017 |
| EP | 2738517 | | 6/2014 |
| EP | 2738517 | | 4/2016 |

OTHER PUBLICATIONS

Xutong Niu; "A semi-automatic framework for highway extraction and vehicle detection based on a geometric deformable model"; SPRS Journal of Photogrammetry & Remote Sensing 61 (2006) 170-186; pp. 172-173 (Year: 2006).*

Eric Salerno, Nagavenkat Adurthi, Tarunraj Singh, Puneet Singla; Road Network Identification by means of the Hough Transform with Uncertainty Analysis; 2015; Journal of Advances in Information Fusion vol. 10, No. 1 (Year: 2015).*

International Search Report in PCT/CN2017/109252 dated Jul. 31, 2018, 4 pages.

Written Opinion in PCT/CN2017/109252 dated n Jul. 31, 2018, 4 pages.

* cited by examiner

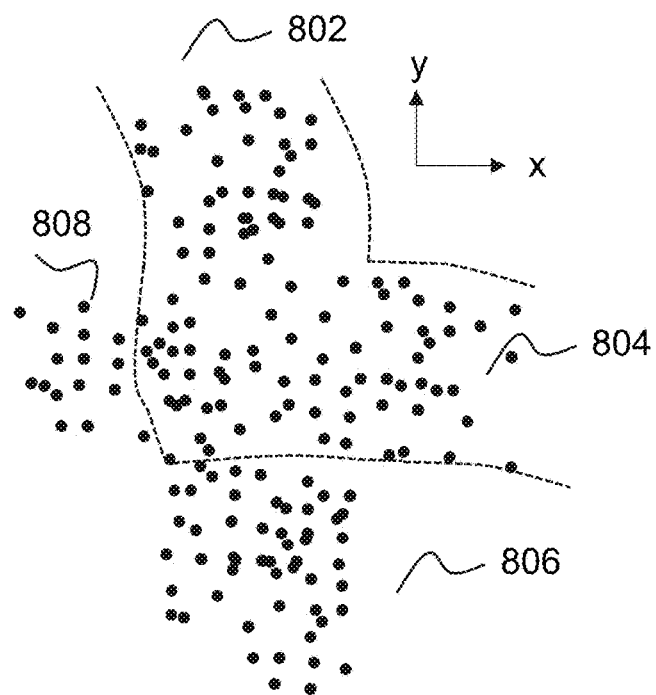
FIG. 8-A
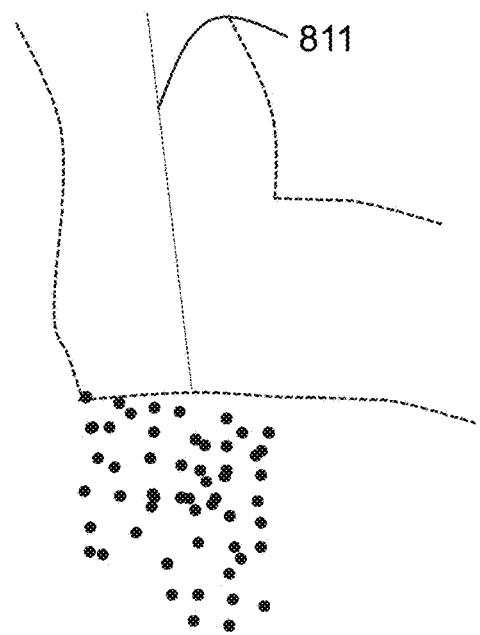
FIG. 8-B
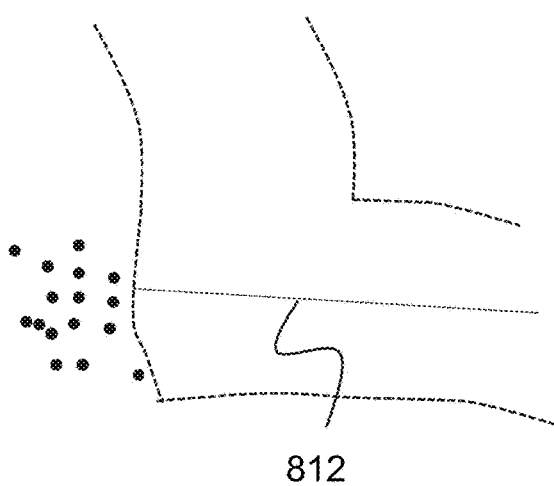
FIG. 8-C
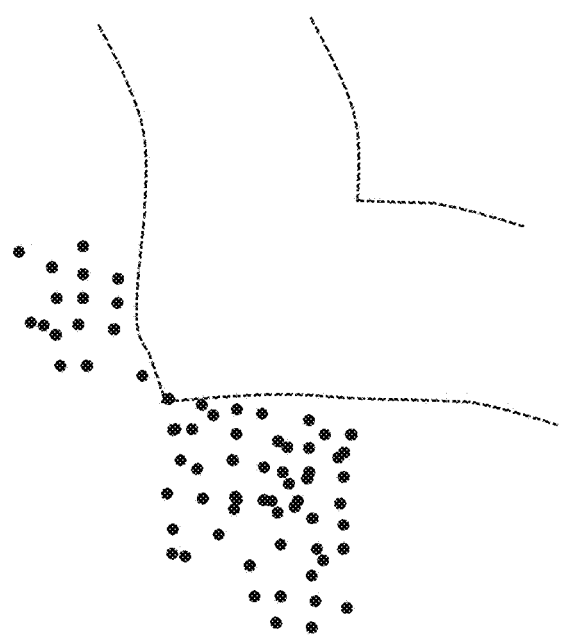
FIG. 8-D

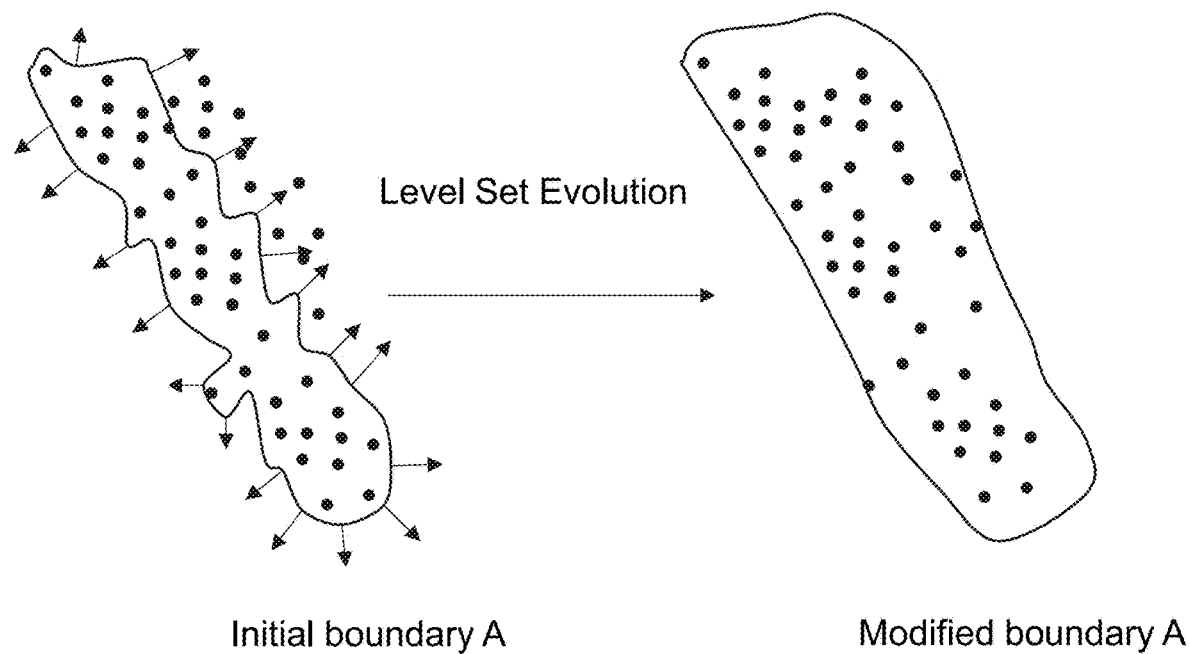
Initial boundary A → Modified boundary A
FIG. 10-A
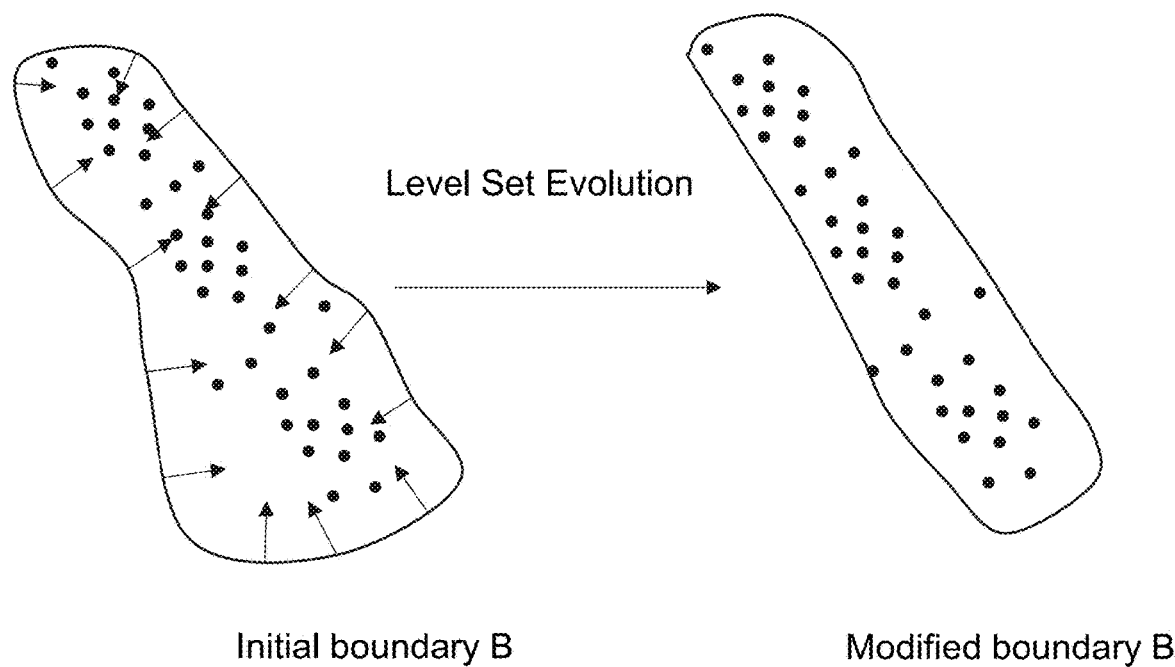
Initial boundary B → Modified boundary B
FIG. 10-B

SYSTEMS AND METHODS FOR NEW ROAD DETERMINATION

CROSS-REFERENCE TO RELATED APPLICATIONS

This application is a continuation of International Application No. PCT/CN2017/109252 filed on Nov. 3, 2017, which designates the United States of America, the contents of which are incorporated herein by reference in their entirety.

TECHNICAL FIELD

The present disclosure generally relates to systems and methods for new road determination, and in particular, to systems and methods for new road determination based on position information associated with vehicles.

BACKGROUND

With rapid development of traffic environment, map services play an important role in modern society. When some new roads are newly built, a system for providing map services may obtain road information associated with the newly built roads from hardware components (e.g., cameras) and update maps based on the road information. However, in some situations, it may be difficult to detect the road information associated with newly built roads efficiently by the hardware components and the maintenance cost may be relatively high.

SUMMARY

According to an aspect of the present disclosure, a system is provided. The system may include at least one storage medium and at least one processor in communication with the at least one storage medium. The at least one storage medium may include a set of instructions for identifying one or more target roads. When the at least one processor executes the set of instructions, the at least one processor may be directed to perform one or more of the following operations. The at least one processor may obtain a heat map associated with a plurality of driving track points along a plurality of roads in a target region, wherein the plurality of roads may include one or more target roads and one or more reference roads. The at least one processor may obtain a road network map associated with the one or more reference roads in the target region. The at least one processor may produce an intermediate heat map by eliminating pixels in the heat map corresponding to the one or more reference roads in the road network map, eliminating background pixels corresponding to background of the heat map and thinning the heat map, and/or thinning the heat map. The at least one processor may determine start coordinate information and end coordinate information associated with the one or more target roads based on the intermediate heat map according to a linear transformation.

According to another aspect of the present disclosure, a method is provided. The method may be implemented on a computing device having at least one processor, at least one storage medium, and a communication platform connected to a network. The method may include one or more of the following operations. The at least one processor may obtain a heat map associated with a plurality of driving track points along a plurality of roads in a target region, wherein the plurality of roads may include one or more target roads and one or more reference roads. The at least one processor may obtain a road network map associated with the one or more reference roads in the target region. The at least one processor may produce an intermediate heat map by eliminating pixels in the heat map corresponding to the one or more reference roads in the road network map, eliminating background pixels corresponding to background of the heat map and thinning the heat map, and/or thinning the heat map. The at least one processor may determine start coordinate information and end coordinate information associated with the one or more target roads based on the intermediate heat map according to a linear transformation.

According to a further aspect of the present disclosure, a non-transitory computer readable medium is provided. The non-transitory computer readable medium may include a set of instructions for identifying one or more target roads. When the set of instructions is executed by at least one processor, the set of instructions may direct the at least one processor to perform one or more of the following operations. The at least one processor may obtain a heat map associated with a plurality of driving track points along a plurality of roads in a target region, wherein the plurality of roads may include one or more target roads and one or more reference roads. The at least one processor may obtain a road network map associated with the one or more reference roads in the target region. The at least one processor may produce an intermediate heat map by eliminating pixels in the heat map corresponding to the one or more reference roads in the road network map, eliminating background pixels corresponding to background of the heat map and thinning the heat map, and/or thinning the heat map. The at least one processor may determine start coordinate information and end coordinate information associated with the one or more target roads based on the intermediate heat map according to a linear transformation.

In some embodiments, the plurality of driving track points may be obtained based on position information associated with a plurality of vehicles in the target region.

In some embodiments, the at least one processor may eliminate a plurality of pixels corresponding to the one or more reference roads in the heat map based on a stroke width transformation (SWT) algorithm.

In some embodiments, the at least one processor may determine a reference line in the heat map along a reference road of the one or more reference roads. The at least one processor may determine an elimination line vertical to the reference line in the heat map. The at least one processor may eliminate pixels along the elimination line based on a gradient threshold.

In some embodiments, the reference line may be a center line of the reference road.

In some embodiments, the at least one processor may identify an intersection between a first group of pixels corresponding to a first group of driving track points and a second group of pixels corresponding to a second group of driving track points in the heat map. The at least one processor may perform a first elimination of pixels along a first reference line associated with the first group of pixels based on the gradient threshold. The at least one processor may perform a second elimination of pixels along a second reference line associated with the second group of pixels based on the gradient threshold. The at least one processor may determine a target elimination result based on an overlapping result of the first elimination and the second elimination.

In some embodiments, the at least one processor may determine an initial boundary corresponding to a target road of the one or more target roads in the intermediate heat map. The at least one processor may perform a level set evolution based on the initial boundary. The at least one processor may determine a modified boundary based on the level set evolution. The at least one processor may determine pixels corresponding to the target road based on the modified boundary.

In some embodiments, the road network map may be not associated with the one or more target roads, and the intermediate heat map may include one or more lines corresponding to the one or more target roads.

In some embodiments, the linear transformation may include a Hough transformation.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 8-A through 8-D are schematic diagrams illustrating an exemplary process for eliminating pixels corresponding to one or more reference roads associated with an intersection according to some embodiments of the present disclosure;

FIGS. 10-A and 10-B are schematic diagrams illustrating an exemplary process for determining pixels corresponding to a new road based on a level set evolution algorithm according to some embodiments of the present disclosure.

DETAILED DESCRIPTION

Figure 1:
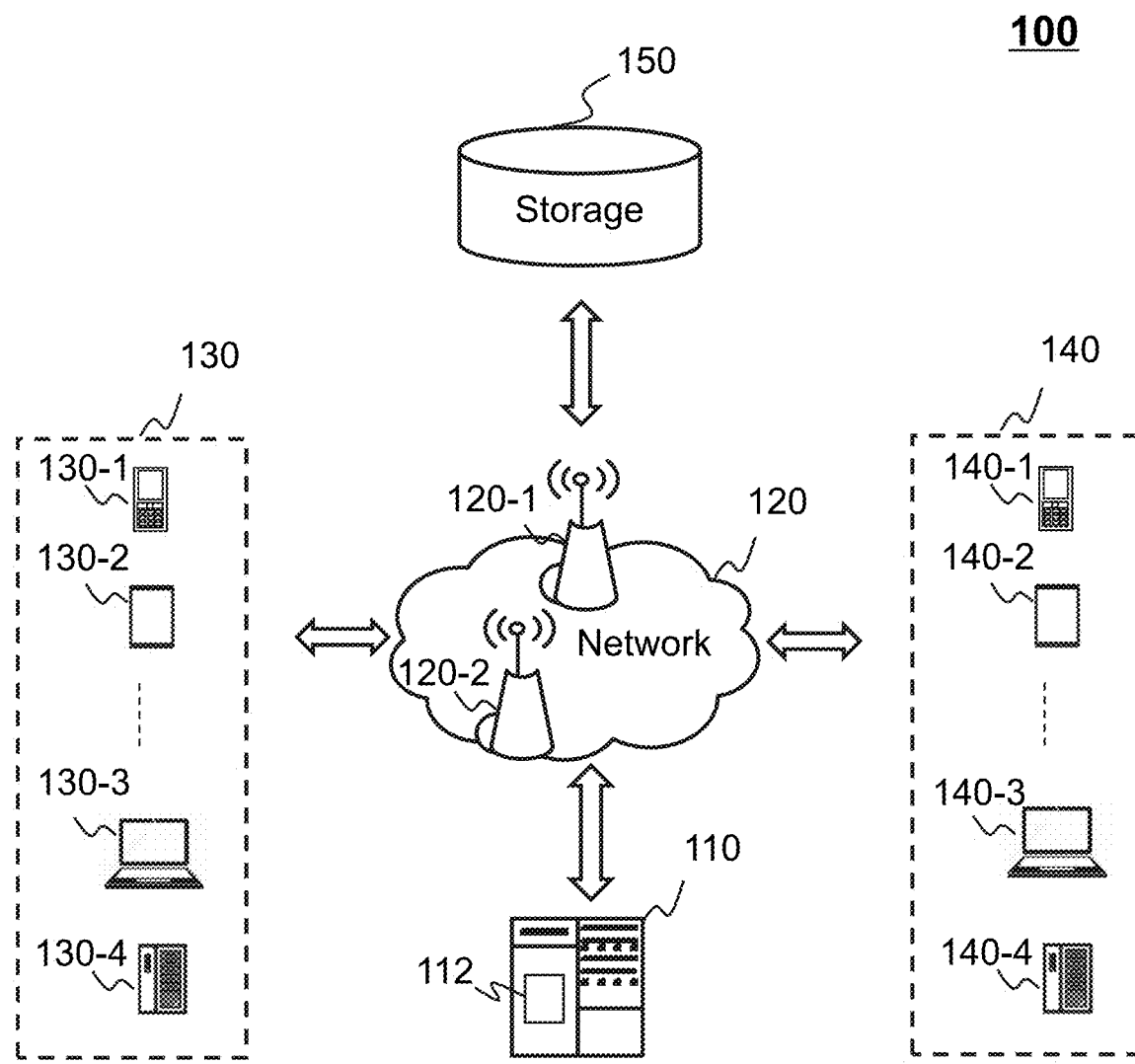
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand transportation service, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a driverless vehicle, or the like, or any combination thereof. The transportation system may also include any transportation system that applies management and/or distribution, for example, a system for transmitting and/or receiving an express. The application scenarios of the system or method of the present disclosure may include a web page, a plug-in of a browser, a client terminal, a custom system, an internal analysis system, an artificial intelligence robot, or the like, or any combination thereof.

The terms "passenger," "requestor," "service requestor," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for determining coordinate information associated with one or more new roads based on position information (e.g., GPS information) of a plurality of vehicles. For example, the systems and methods may obtain a heat map associated with a plurality of driving track points along a plurality of roads in a target region (e.g., a city). The plurality of roads may include one or more old roads (i.e., a road that has been expressed in a current road network map) and one or more new roads (e.g., a newly built road). The systems and methods may further produce an intermediate heat map based on the heat map and the current road network map. For example, the systems and methods may eliminate pixels in the heat map corresponding to the one or more old roads in the current road network map, eliminate background pixels corresponding to background of the heat map, and/or thin the heat map. Further, the systems and methods may determine coordinate information associated with the one or more new roads based on the intermediate map.

It should be noted that GPS positioning, overall, is a technology deeply rooted in Internet world. Determining one or more new roads based on position information associated with vehicles is not possible without the possibility of communication between terminal devices and a remote server. Therefore, the technical solution disclosed in the present disclosure is also a technology deeply rooted in Internet era.

FIG. 1 is a schematic diagram of an exemplary on-demand service system 100 according to some embodiments of the present disclosure. For example, the on-demand service system 100 may be an online transportation service platform for transportation services such as taxi hailing, chauffeur services, delivery vehicles, carpool, bus service, driver hiring, and shuttle services. The on-demand service system 100 may be a platform including a server 110, a network 120, a requestor terminal 130, a provider terminal 140, and a storage 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may connect the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may obtain position information (e.g., GPS information) associated with a plurality of vehicles from a plurality of provider terminals 140 and generate a heat map associated with a plurality of driving track points based on the position information. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requestor terminal 130, the provider terminal 140, and the storage 150) may transmit information and/or data to other component(s) in the on-demand service system 100 via the network 120. For example, the server 110 may receive GPS information from the provider terminal 140 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a requestor may be a user of the requestor terminal 130. In some embodiments, the user of the requestor terminal 130 may be someone other than the requestor. For example, a user A of the requestor terminal 130 may use the requestor terminal 130 to transmit a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the provider terminal 140 may periodically transmit GPS information to the server 110. In some embodiments, the requestor terminal 130 and/or the provider terminal 140 may communicate with another positioning device to determine the position of the requestor, the requestor terminal 130, the provider, and/or the provider terminal 140. In some embodiments, the requestor terminal 130 and/or the provider terminal 140 may transmit positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requestor terminal 130, the provider terminal 140). One or more components in the on-demand service system 100 may access the data or instructions stored in the storage 150 via the network 120. In some embodiments, the storage 150 may be directly connected to or communicate with one or more components in the on-demand service system 100 (e.g., the server 110, the requestor terminal 130, the provider terminal 140). In some embodiments, the storage 150 may be part of the server 110.

In some embodiments, one or more components of the on-demand service system 100 (e.g., the server 110, the requestor terminal 130, the provider terminal 140) may access the storage 150. In some embodiments, one or more components of the on-demand service system 100 may read and/or modify information relating to the requester, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components of the on-demand service system 100 may be achieved by way of requesting a service. The object of the service request may be any product. In some embodiments, the product may be a tangible product, or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), or the like, or any combination thereof.

One of ordinary skill in the art would understand that when an element of the on-demand service system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

It should be noted that the application scenario illustrated in FIG. 1 is only provided for illustration purposes, and not intended to limit the scope of the present disclosure. For example, the on-demand service system 100 may be used as a navigation system. The navigation system may include a user terminal (e.g., the provider terminal 140) and a server (e.g., the server 110). When a user intends to drive a vehicle to a destination, the navigation system may provide a navigation service for the user and during the navigation service, the navigation system may periodically obtain GPS information of the vehicle from a GPS device integrated in the user terminal. The navigation system may obtain GPS information associated with a plurality of vehicles within a predetermined time period (e.g., 1 month) in a region (e.g., a city) and determine coordinate information associated with one or more new roads based on the GPS information according to the process and/or method described in this disclosure.

Figure 2:
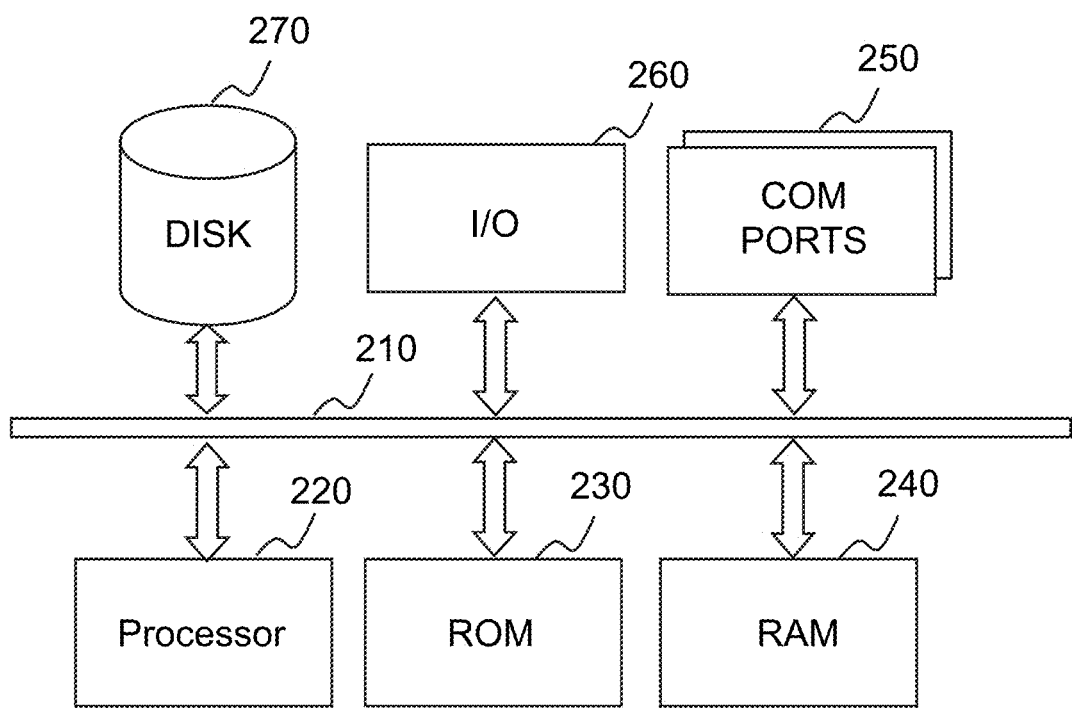
FIG. 2 is a schematic diagram illustrating exemplary hardware and/or software components of an exemplary computing device according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may also include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
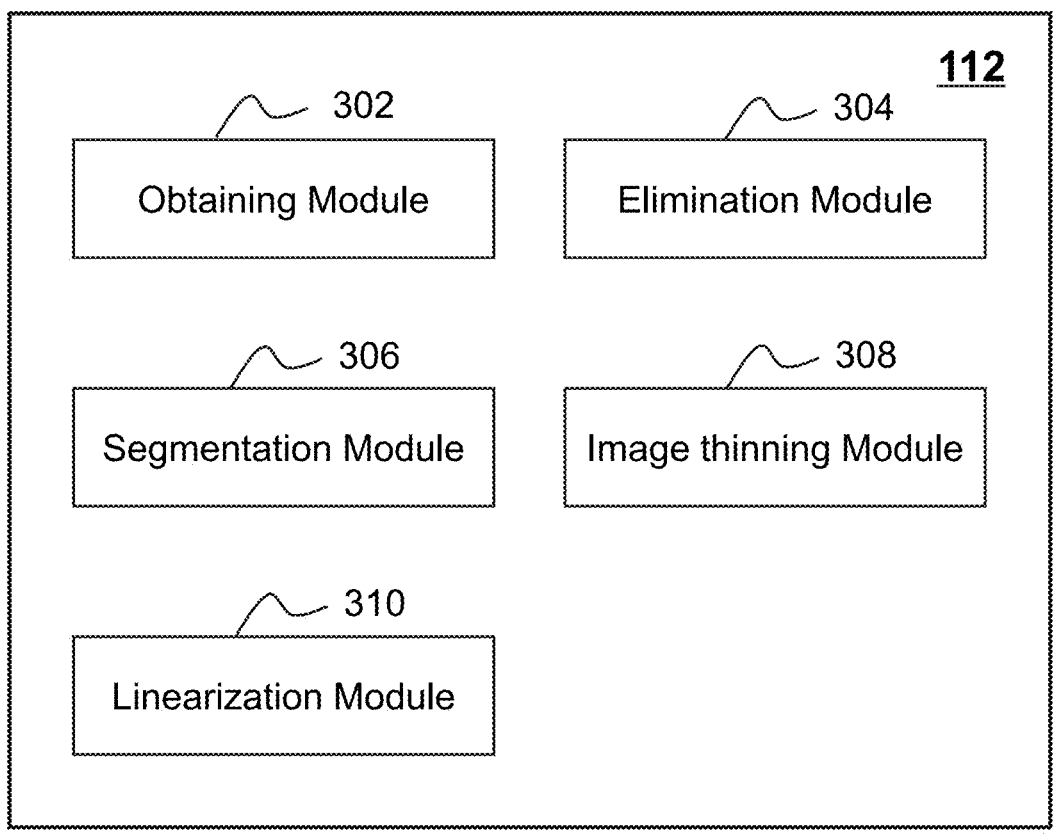
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an obtaining module 302, an elimination module 304, a segmentation module 306, an image thinning module 308, and a linearization module 310.

The obtaining module 302 may be configured to obtain a map associated with a target region. The target region may be a city, a district, a predetermined geographic region with a certain radius (e.g., 500 m, 1 km, 5 km, 10 km) from a predetermined center location, etc. The map associated with the target region may include a heat map associated with a plurality of driving track points along a plurality of roads including one or more reference roads (i.e., old road(s)) and one or more target roads (i.e., new road(s)) in the target region, a road network map associated with the one or more reference roads in the target region, etc. The old road may refer to a road that has been expressed in the road network map, the new road may refer to a newly built road or a road that has not been expressed in the road network map. The obtaining module 302 may obtain the map from a storage device (e.g., the storage 150) disclosed elsewhere in the present disclosure.

As used herein, the heat map may be a graphical image (e.g., a red green blue (RGB) image) including background information (e.g., buildings, reference roads) and the plurality of driving track points. For example, the processing engine 112 may add the plurality of driving track points on a map (e.g., a Google Map, a Baidu Map) to obtain the heat map. The plurality of driving track points may be obtained based on position information (e.g., GPS information) associated with a plurality of vehicles within a predetermined period (e.g., the last week, the last month).

The road network map may be a grayscale image including one or more lines, wherein each line indicates a reference road. In some embodiments, a width of each line may be 1 pixel, 2 pixels, 5 pixels, 10 pixels, etc. In some embodiments, values of pixels corresponding to the one or more lines may be, for example, 1 through 6, and values of pixels corresponding to background may be, for example, 0. In some embodiments, roads with different levels may be expressed by lines with different pixel values. For example, an expressway may be expressed by a line with a relatively high pixel value (e.g., 6), while a country-level road may be expressed by a line with a relatively low pixel value (e.g., 2).

The elimination module 304 may be configured to eliminate pixels in the heat map corresponding to the one or more reference roads. In some embodiments, the elimination module 304 may eliminate the plurality of pixels in the heat map corresponding to the one or more reference roads in the road network map based on a neighborhood elimination technique. In some embodiments, the elimination module 304 may eliminate the plurality of pixels in the heat map corresponding to the one or more reference roads in the road network map based on a stroke width transformation (SWT) algorithm.

The segmentation module 306 may be configured to eliminating background pixels in the heat map. The segmentation module 306 may eliminate the background pixels based on a threshold segmentation algorithm or a level set evolution algorithm.

The image thinning module 308 may be configured to thin the heat map. As described above, after eliminating the plurality of pixels corresponding to the one or more reference roads and the background pixels in the heat map, an intermediate heat map including one or more regions corresponding to the one or more new roads may be obtained. Take a specific region as an example, the image thinning module 308 may modify the specific region (e.g., a rectangle region) to a line (e.g., a center line of the rectangle region) based on an image thinning algorithm. Exemplary image thinning algorithm may include a burning algorithm, a Zhang-Suen thinning algorithm, a Guo-Hall thinning algorithm, a distance-ordered homotopic thinning algorithm, etc.

The linearization module 310 may be configured to determine start coordinate information and end coordinate information associated with the one or more new roads. The linearization module 310 may determine the start coordinate information and the end coordinate information associated with the one or more new roads according to a linear transformation (e.g., a Hough Transform). For example, the linearization module 310 may identify the line determined by the image thinning module 308 and determine the start coordinate information and the end coordinate information of the line based on the Hough Transform.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the elimination module 304 and the segmentation module 306 may be combined as a single module which may both eliminate pixels corresponding to the one or more reference roads and background pixels in the heat map. As another example, the processing engine 112 may include a storage module (not shown) used to store the heat map, the road network map, the intermediate heat map, and/or the coordinate information associated with the one or more new roads.

Figure 4:
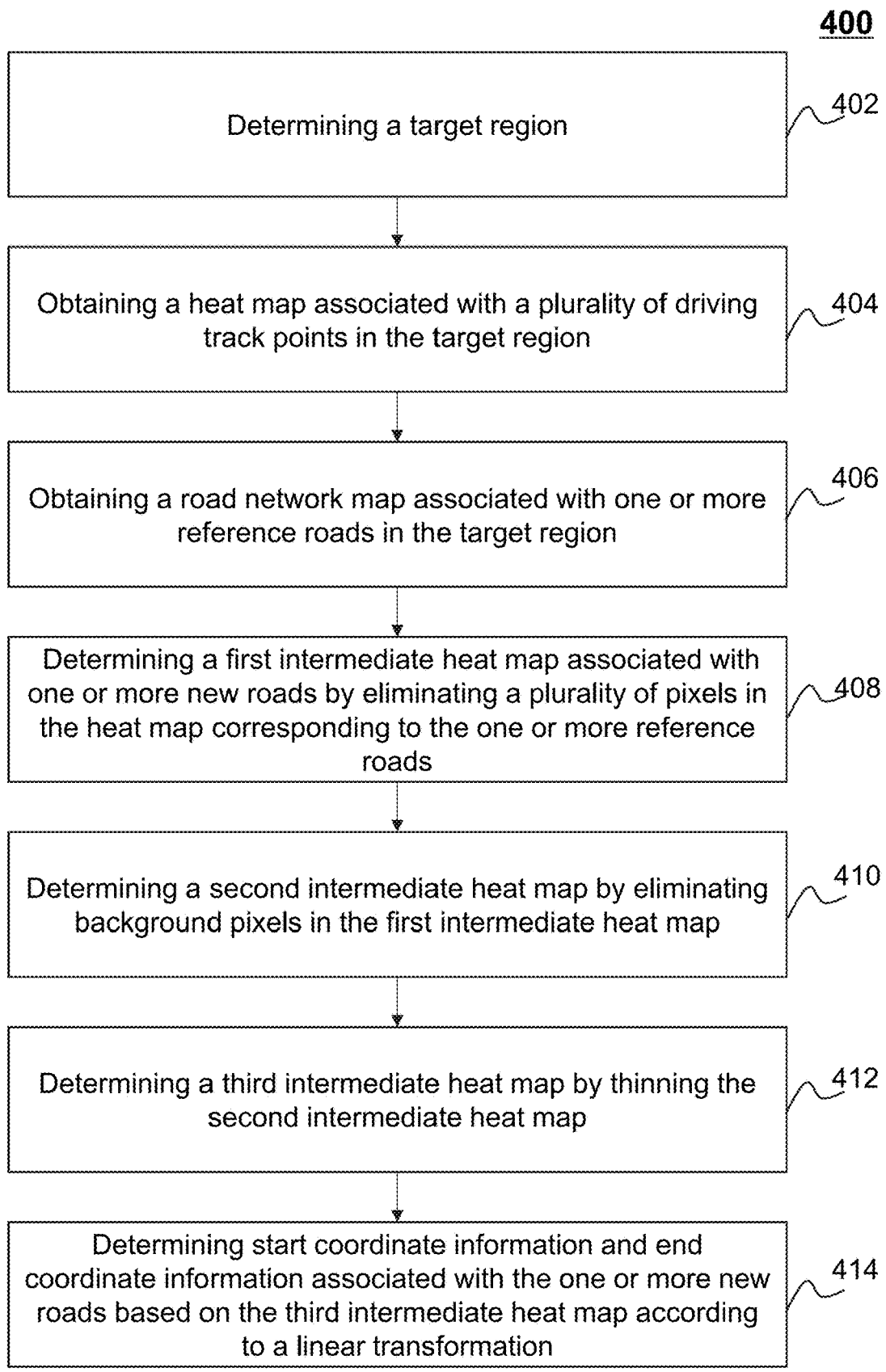
FIG. 4 is a flowchart illustrating an exemplary process for determining coordinate information associated with one or more new roads according to some embodiments of the present disclosure.

FIG. 4 is a flowchart illustrating an exemplary process for determining coordinate information associated with one or more new roads according to some embodiments of the present disclosure. The process 400 may be executed by the on-demand service system 100. For example, the process 400 may be implemented as a set of instructions (e.g., an application) stored in the storage ROM 230 or RAM 240. The processor 220 and/or the modules in FIG. 3 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In step 402, the processing engine 112 (e.g., the obtaining module 302) (e.g., the processing circuits of the processor 220) may determine a target region. The target region may be a city, a district, a predetermined geographic region with a certain radius (e.g., 500 m, 1 km, 5 km, 10 km) from a predetermined center location, etc.

In step 404, the processing engine 112 (e.g., the obtaining module 302) (e.g., the processing circuits of the processor 220) may obtain a heat map associated with a plurality of driving track points along a plurality of roads in the target region. The plurality of roads may include one or more reference roads (i.e., old roads) and one or more target roads (i.e., new roads). The old road may refer to a road that has been expressed in a road network map, the new road may refer to a newly built road or a road that has not been expressed in the road network map.

As used herein, the heat map may be a graphical image (e.g., a red green blue (RGB) image) including background information (e.g., buildings, reference roads) and the plurality of driving track points. For example, the processing engine 112 may add the plurality of driving track points on a map (e.g., a Google Map, a Baidu Map) to obtain the heat map. The plurality of driving track points may be obtained based on position information (e.g., GPS information) associated with a plurality of vehicles within a predetermined period (e.g., the last week, the last month). The processing engine 112 may obtain the position information associated with the plurality of vehicles from a plurality of provider terminals 140, a plurality of positioning devices integrated in the plurality of vehicles, or a storage device (e.g., the storage 150) disclosed elsewhere in the present disclosure. For a specific region in the heat map, the more the driving track points are, the more vehicles passing through the region in the predetermined period may be, and the deeper the color of the region may be (indicating that the larger the pixel values of the region may be).

In step 406, the processing engine 112 (e.g., the obtaining module 302) (e.g., the interface circuits of the processor 220) may obtain a road network map associated with one or more reference roads (i.e., old roads) in the target region. The processing engine 112 may obtain the road network map from a storage device (e.g., the storage 150) disclosed elsewhere in the present disclosure.

As used herein, the road network map may be a grayscale image including one or more lines, wherein each line indicates a reference road. In some embodiments, a width of each line may be 1 pixel, 2 pixels, 5 pixels, 10 pixels, etc. In some embodiments, values of pixels corresponding to the one or more lines may be, for example, 1 through 6, and values of pixels corresponding to background may be, for example, 0. In some embodiments, roads with different levels may be expressed by lines with different pixel values. For example, an expressway may be expressed by a line with a relatively high pixel value (e.g., 6), while a country-level road may be expressed by a line with a relatively low pixel value (e.g., 2).

In step 408, the processing engine 112 (e.g., the elimination module 304) (e.g., the processing circuits of the processor 220) may determine a first intermediate heat map associated with one or more new roads by eliminating a plurality of pixels in the heat map corresponding to the one or more reference roads in the road network map (i.e., eliminating a plurality of pixels associated with a plurality of driving track points along the one or more reference roads).

In some embodiments, the processing engine 112 may eliminate the plurality of pixels in the heat map corresponding to the one or more reference roads in the road network map based on a neighborhood elimination technique. As described above, the road network map and the heat map correspond to a same geographic region (i.e., the target region), therefore, take a specific reference road as an example, the processing engine 112 may determine a plurality of reference pixels in the heat map corresponding to a specific line indicating the specific reference road in the road network map. Further, the processing engine 112 may eliminate pixels adjacent to the plurality of reference pixels based on an elimination range (e.g., 3*3, 5*5, 10*10, 20*20). In some embodiments, the elimination range may be default settings of the on-demand service system 100, or may be adjustable under different situations. In some embodiments, the processing engine 112 may adjust the elimination range based on a machine learning model (e.g., a Neural Network Model, a Bayesian Network Model, a Decision Tree Model).

In some embodiments, the processing engine 112 may eliminate the plurality of pixels in the heat map corresponding to the one or more reference roads in the road network map based on a stroke width transformation (SWT) algorithm. Also take a specific reference road as an example, the processing engine 112 may determine a reference line (e.g., a center line of the reference road) in the heat map corresponding to the specific reference road. Further, the processing engine 112 may eliminate pixels along a plurality of elimination lines vertical to the reference line based on the SWT algorithm (see, e.g., FIGS. 6-8 and the description thereof).

In step 410, the processing engine 112 (e.g., the segmentation module 306) (e.g., the processing circuits of the processor 220) may determine a second intermediate heat map by eliminating background pixels corresponding to background of the first intermediate heat map. In some embodiments, the processing engine 112 may eliminate the background pixels based on a pixel threshold. In some embodiments, the processing engine 112 may eliminate the background pixels in the first intermediate heat map based on a level set evolution algorithm (see, e.g., FIG. 9 and the description thereof).

In step 412, the processing engine 112 (e.g., the image thinning module 310) (e.g., the processing circuits of the processor 220) may determine a third intermediate heat map by thinning (e.g., conducting image thinning to) the second intermediate heat map. Here, thinning is the transformation of a digital image into a simplified, but topologically equivalent image. It is a type of topological skeleton, but computed using mathematical morphology operators. As described above, after eliminating the plurality of pixels corresponding to the one or more reference roads and the background pixels in the heat map, the processing engine 112 may determine the second intermediate heat map including one or more regions corresponding to the one or more new roads, wherein the one or more regions include a plurality of pixels associated with a plurality of driving track points along the one or more new roads. Take a specific region as an example, the processing engine 112 may modify the specific region (e.g., a rectangle region) to a line (e.g., a center line of the rectangle region) based on an image thinning algorithm. Therefore, the third intermediate heat map may include one or more lines corresponding to the one or more new roads. Exemplary image thinning algorithm may include a burning algorithm, a Zhang-Suen thinning algorithm, a Guo-Hall thinning algorithm, a distance-ordered homotopic thinning algorithm, etc.

In step 414, the processing engine 112 (e.g., the linearization module 310) (e.g., the processing circuits of the processor 220) may determine start coordinate information and end coordinate information associated with the one or more new roads. In some embodiments, the processing engine 112 may determine start coordinate information and end coordinate information associated with the one or more new roads based on the third intermediate heat map according to a linear transformation (e.g., a Hough Transform). For example, the processing engine 112 may identify the line determined in step 412 and determine the start coordinate information and the end coordinate information of the line based on the Hough Transform.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 400. In the storing step, the processing engine 112 may store the first intermediate heat map, the second intermediate heat map, and/or the third intermediate heat map in a storage device (e.g., the storage 150) disclosed elsewhere in the present disclosure. As another example, step 404 and step 406 may be combined as a single step in which the processing engine 112 may obtain both the heat map and the road network map.

Figure 5:
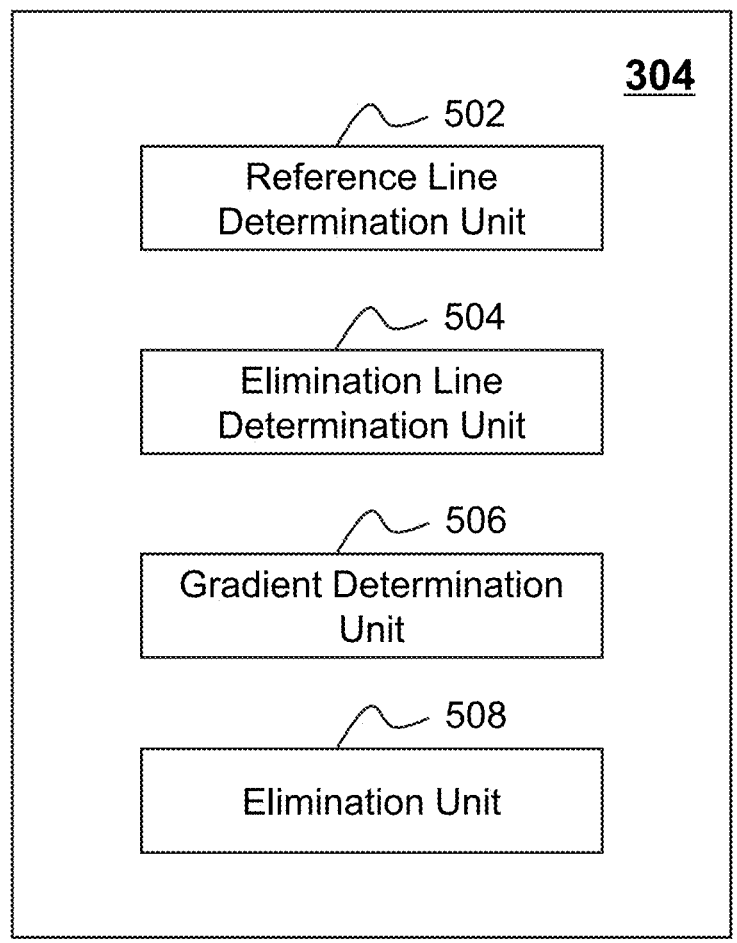
FIG. 5 is a block diagram illustrating an exemplary elimination module according to some embodiments of the present disclosure.

FIG. 5 is a block diagram illustrating an exemplary elimination module 304 according to some embodiments of the present disclosure. The elimination module 304 may include a reference line determination unit 502, an elimination line determination unit 504, a gradient determination unit 506, and an elimination unit 508.

The reference line determination unit 502 may be configured to determine one or more reference lines associated with one or more reference roads. As used herein, a reference line may be a centerline of a reference road or a candidate line inside the reference road parallel to or substantially parallel to the centerline. As used herein, "substantially parallel" may indicate that the angle between the candidate line and the centerline is less than a threshold (e.g., 3°, 5°, 10°, 15°, 20°). In some embodiments, a width of the reference line may be 1 pixel.

The elimination line determination unit 504 may be configured to determine one or more elimination lines based on the one or more reference lines. Take a specific reference line (e.g., 704 illustrated in FIG. 7) as an example, the elimination line determination unit 504 may select a reference pixel (e.g., $P_1$ illustrated in FIG. 7) on the reference line and determine an elimination line (e.g., $L_1$ illustrated in FIG. 7) vertical to the reference line based on the reference pixel. The elimination line may include a first elimination direction (e.g., $L_{11}$ illustrated in FIG. 7) and a second elimination direction (e.g., $L_{12}$ illustrated in FIG. 7).

The gradient determination unit 506 may be configured to determine whether a gradient of a pixel on the elimination line reaches a gradient threshold. In some embodiments, the gradient threshold may be default settings of the on-demand service system 100, or may be adjustable under different situations. As described elsewhere in the present disclosure, the heat map may include background and a plurality of driving track points. When a gradient of a pixel on the elimination line reaches the gradient threshold, it may indicate that pixels associated with driving track points along the elimination line have been eliminated.

The elimination unit 508 may be configured to eliminate pixels on the one or more elimination lines based on a determination that a gradient of the pixel on the elimination line is smaller than the gradient threshold. For a specific elimination line, the elimination unit 508 may perform a first elimination along the first elimination direction and a second elimination along the second elimination direction simultaneously or successively.

The units in the elimination module 304 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined into a single module, and any one of the units may be divided into two or more sub-units. For example, the reference line determination unit 502 and the elimination line determination unit 504 may be combined as a single module which may both determine one or more reference lines corresponding to one or more reference roads and a plurality of elimination lines corresponding to each of the one or more reference lines. As another example, the elimination module 304 may include a storage unit (not shown) which may be used to store any information (e.g., the reference line, the elimination line, the gradient threshold) associated with the one or more reference roads.

Figure 6:
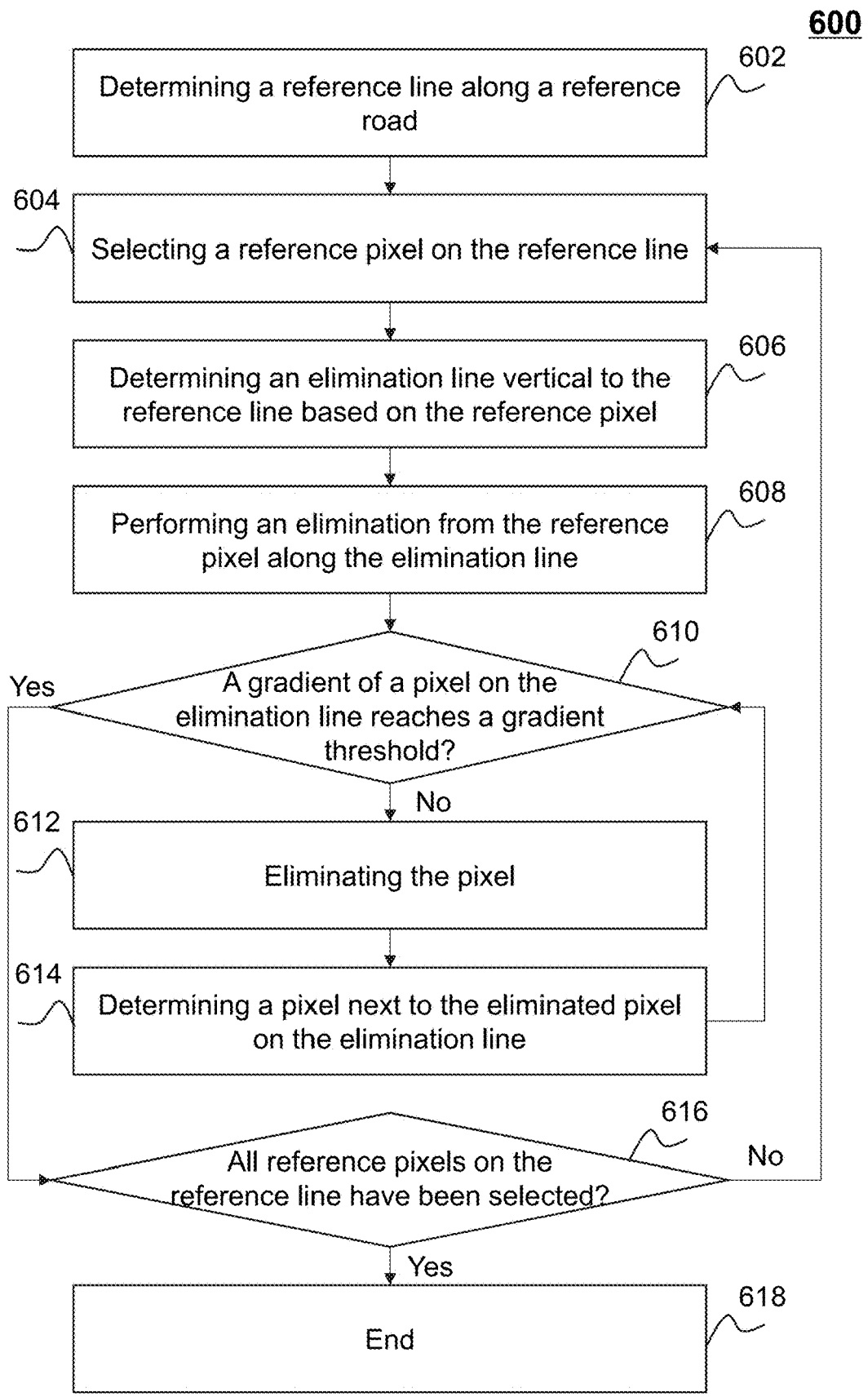
FIG. 6 is a flowchart illustrating an exemplary process for eliminating pixels in a heat map corresponding to one or more reference roads according to some embodiments of the present disclosure.

FIG. 6 is a flowchart illustrating an exemplary process for eliminating a plurality of pixels in a heat map corresponding to one or more reference roads according to some embodiments of the present disclosure. In some embodiments, step 408 of process 400 may be performed based on the process 600. The process 600 may be executed by the on-demand service system 100. For example, the process 600 may be implemented as a set of instructions (e.g., an application) stored in the storage ROM 230 or RAM 240. The processor 220 and/or the modules in FIG. 5 may execute the set of instructions and, when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In step 602, the processing engine 112 (e.g., the reference line determination unit 502) (e.g., the processing circuits of the processor 220) may determine a reference line along a reference road in the heat map. The reference line may be a centerline of the reference road or a candidate line inside the reference road parallel to or substantially parallel to the centerline. As used herein, "substantially parallel" may indicate that the angle between the candidate line and the centerline is less than a threshold (e.g., 3°, 5°, 10°, 15°, 20°).

Take a specific reference road as an example, the processing engine 112 may identify a line (e.g., 702 illustrated in FIG. 7) indicating the specific reference road in the road network map, determine a centerline (e.g., 703 illustrated in FIG. 7) of the line, and determine a reference line (e.g., 704 illustrated in FIG. 7) in the heat map corresponding to the centerline. In some embodiments, the width of the reference line may be 1 pixel.

In step 604, the processing engine 112 (e.g., the elimination line determination unit 504) (e.g., the processing circuits of the processor 220) may select a reference pixel (e.g., $P_1$ illustrated in FIG. 7) on the reference line.

In step 606, the processing engine 112 (e.g., the elimination line determination unit 504) (e.g., the processing circuits of the processor 220) may determine an elimination line (e.g., $L_1$ illustrated in FIG. 7) vertical to the reference line based on the reference pixel. The elimination line may include a first elimination direction (e.g., $L_{11}$ illustrated in FIG. 7) and a second elimination direction (e.g., $L_{12}$ illustrated in FIG. 7).

In step 608, the processing engine 112 (e.g., the elimination unit 508) (e.g., the processing circuits of the processor 220) may perform an elimination from the reference pixel along the elimination line. The processing engine 112 may perform a first elimination along the first elimination direction and a second elimination along the second elimination direction simultaneously or successively.

In step 610, the processing engine 112 (e.g., the gradient determination unit 506) (e.g., the processing circuits of the processor 220) may determine whether a gradient of a pixel on the elimination line reaches a gradient threshold. In some embodiments, the gradient threshold may be default settings of the on-demand service system 100, or may be adjustable under different situations.

In response to the determination that the gradient of the pixel on the elimination line is smaller than the gradient threshold, the processing engine 112 may eliminate the pixel in step 612 and determine a pixel next to the eliminated pixel on the elimination line in step 614 until the pixel on the elimination line reaches the gradient threshold.

In response to the determination that the gradient of the pixel on the elimination line is larger than or equal to the gradient threshold, the processing engine 112 may execute the process 600 to step 616 to determine whether all reference pixels on the reference line have been selected.

In response to the determination that all reference pixels on the reference line have been selected, the processing engine 112 may execute the process 600 to step 618 to the end the process 600. On the other hand, the processing engine 112 may execute the process 600 to return to step 604 to select another reference pixel on the reference line until all reference pixels on the reference line have been selected. In some embodiments, the processing engine 112 may select the reference pixels on the reference line in order from a start point (e.g., point M illustrated in FIG. 7) to an end point (e.g., point N illustrated in FIG. 7). In some embodiments, the processing engine 112 may select the reference pixels on the reference line in a random order.

For illustration purposes, the present disclosure takes a single reference road as an example, it should be noted that the processing engine 112 may perform elimination on the plurality of pixels corresponding to the one or more reference roads.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600. In the storing step, the processing engine 112 may store the reference line, the elimination line, and/or the gradient threshold in any storage device (e.g., the storage 150) disclosed elsewhere in the present disclosure.

Figure 7:
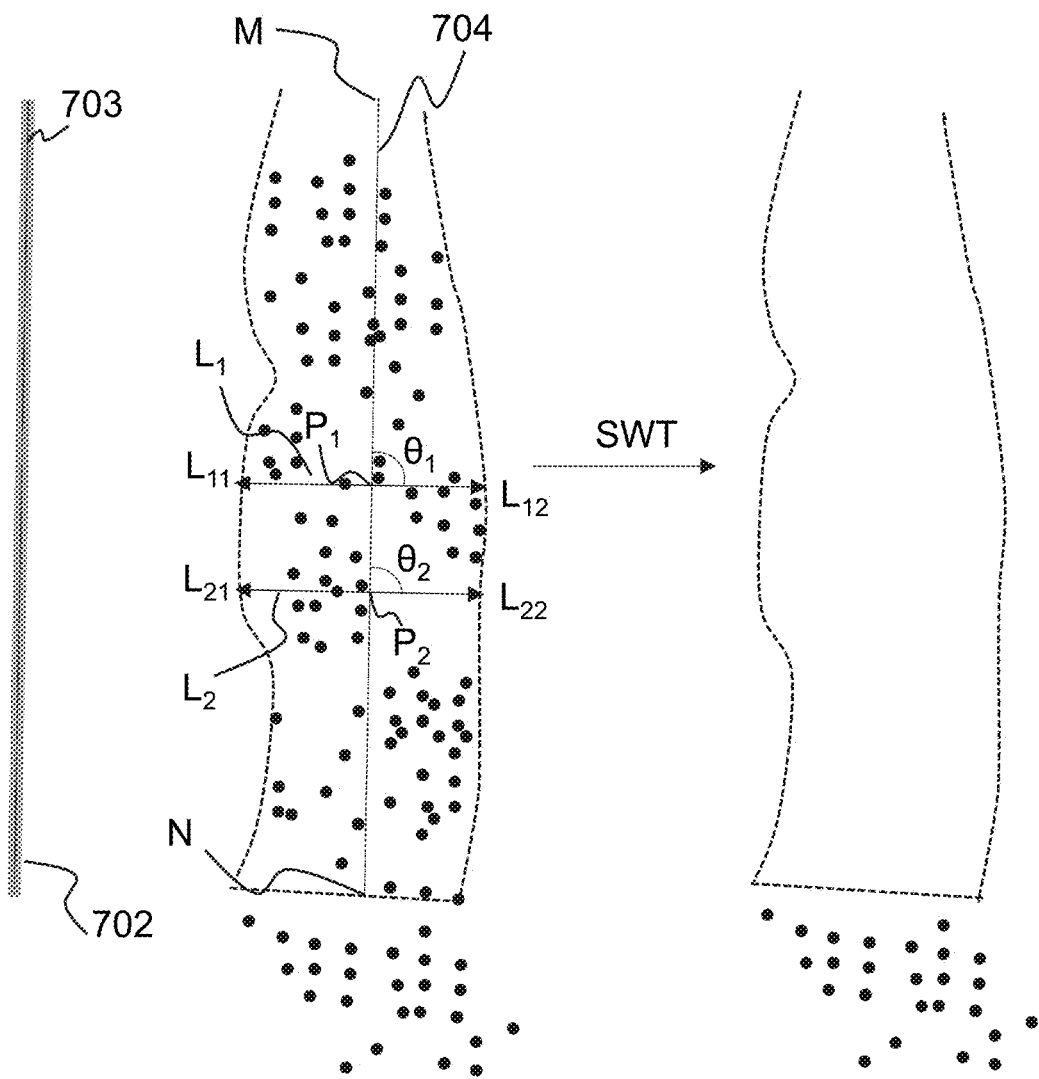
FIG. 7 is a schematic diagram illustrating an exemplary process for eliminating pixels corresponding to a reference road based on a stroke width transformation (SWT) algorithm according to some embodiments of the present disclosure.

FIG. 7 is a schematic diagram illustrating an exemplary process for eliminating a plurality of pixels corresponding to a reference road based on a SWT algorithm according to some embodiments of the present disclosure.

As illustrated in FIG. 7, a gray line 702 in the road network map indicates a reference road. The processing engine 112 may determine a center line 703 of the gray line 702 and determine a reference line 704 corresponding to the center line 703 in the heat map, wherein the solid dots refer to driving track points along the reference road. Further, the processing engine 112 may select a reference pixel $P_1$ on the reference line 704 and determine an elimination line $L_1$ vertical to (see, $\theta_1=90°$ the reference line 704. As illustrated, the elimination line $L_1$ includes a first elimination direction $L_{11}$ and a second elimination direction $L_{12}$. The processing engine 112 may perform a first elimination along the first elimination direction and a second elimination along the second elimination direction simultaneously or successively. The processing engine 112 may complete the elimination along the elimination line $L_1$ until a gradient of a pixel on the elimination line reaches a gradient threshold.

Further, the processing engine 112 may select another reference pixel (e.g., $P_2$), determine another elimination line (e.g., $L_2$) vertical to (see, $\theta_2=90°$) the reference line 704, and perform another elimination along the elimination line $L_2$. The processing engine 112 may complete the elimination associated with the reference road 702 until all reference pixels on the reference line 704 have been selected. In some embodiments, the processing engine 112 may select the reference pixels on the reference line in order from a start point (e.g., point M) to an end point (e.g., point N). In some embodiments, the processing engine 112 may select the reference pixels on the reference line in a random order.

FIGS. 8-A through 8-D are schematic diagrams illustrating an exemplary process for eliminating pixels corresponding to one or more reference roads associated with an intersection according to some embodiments of the present disclosure.

As illustrated in FIG. 8-A, the intersection may be associated with four roads, wherein 802 and 804 refer to reference roads, 806 and 808 refer to new roads, and the solid dots refer to driving track points associated with the intersection. The reference road 802 may correspond to a first group of pixels associated with a plurality of driving track points along the reference road 802, the reference road 804 may correspond to a second group of pixels associated with a plurality of driving track points along the reference road 804, the new road 806 may correspond to a third group of pixels associated with a plurality of driving track points along the new road 806, and the new road 808 may correspond to a fourth group of pixels associated with a plurality of driving track points along the new road 808.

As illustrated in FIG. 8-B, the processing engine 112 may determine a reference line 811 corresponding to the reference road 802 and perform a first candidate elimination along the reference line 811 based on the process 600.

As illustrated in FIG. 8-C, the processing engine 112 may determine a reference line 812 corresponding to the reference road 804 and perform a second candidate elimination along the reference line 812 based on the process 600.

As illustrated in FIG. 8-D, the processing engine 112 may further determine a target elimination result based on an overlapping result of the first candidate elimination and the second elimination, which can avoid that the pixels associated with the driving track points along the new roads 806 and 808 may be wrongly eliminated.

Figure 9:
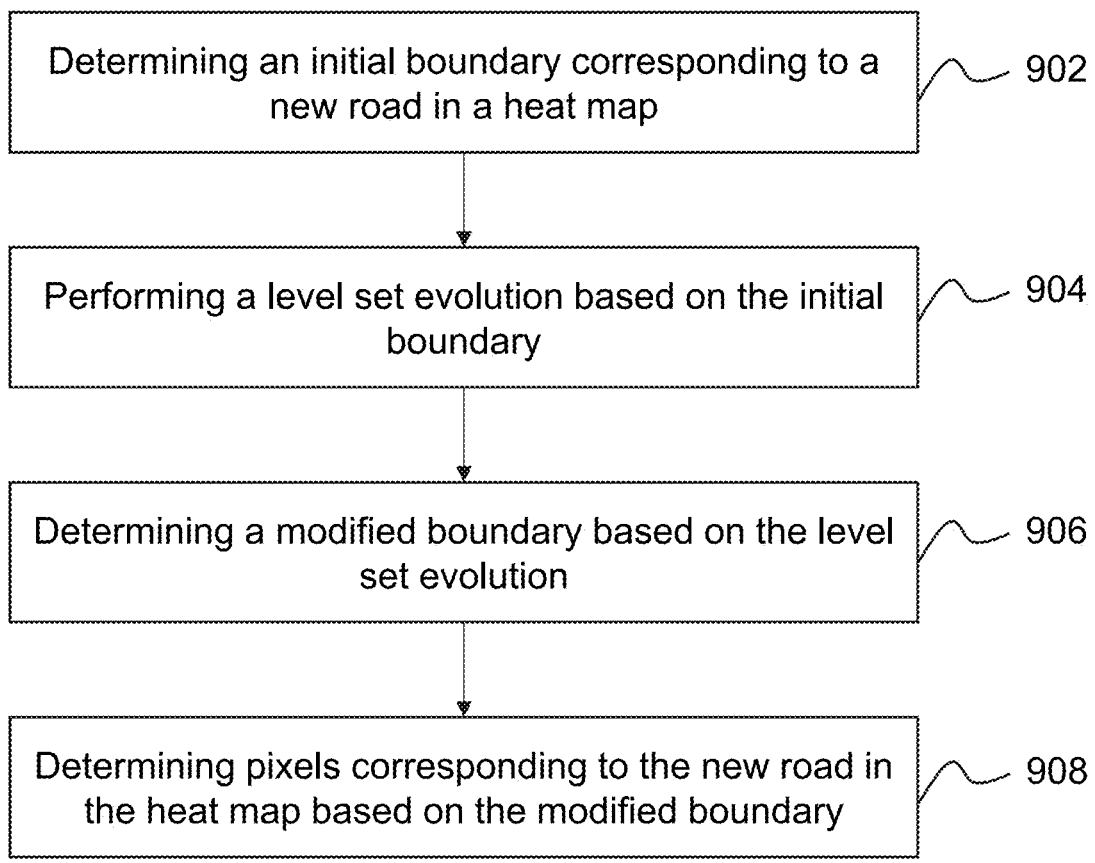
FIG. 9 is a flowchart illustrating an exemplary process for determining pixels corresponding to a new road in a heat map according to some embodiments of the present disclosure.

FIG. 9 is a flowchart illustrating an exemplary process for determining a new road in the map according to some embodiments of the present disclosure. In some embodiments, step 410 of process 400 may be performed based on the process 900. The process 900 may be executed by the on-demand service system 100. For example, the process 900 may be implemented as a set of instructions (e.g., an application) stored in the storage ROM 230 or RAM 240. The processor 220 and/or the segmentation module 306 may execute the set of instructions, and when executing the instructions, the processor 220 and/or the segmentation module 306 may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

As described in connection with step 408, after eliminating the plurality of pixels in the heat map corresponding to the one or more reference roads (i.e., old roads), the first intermediate heat map includes pixels corresponding to the one or more new roads and pixels corresponding to background of the heat map. Further, the processing engine 112 may determine the pixels corresponding to the one or more new roads based on a level set evolution algorithm and determine the second intermediate heat map by eliminating the pixels corresponding to the background of the heat map.

Take a specific new road as an example, in step 902, the processing engine 112 (e.g., segmentation module 306) (e.g., the processing circuits of the processor 220) may determine an initial boundary corresponding to the specific target road in the first intermediate map. As used herein, the initial boundary may indicate an initial region including a part or the whole of pixels corresponding to the specific new road (e.g., initial boundary A or initial boundary B illustrated in FIG. 10). In some embodiments, the processing engine 112 may determine the initial boundary based on a pixel threshold. The pixel threshold may be default settings of the system 100, or may be adjustable under different situations. In some embodiments, the processing engine 112 may randomly define a region in the heat map and determine a boundary of the region as the initial boundary.

In step 904, the processing engine 112 (e.g., segmentation module 306) (e.g., the processing circuits of the processor 220) may perform a level set evolution based on the initial boundary. According to the level set evolution, each pixel on the initial boundary may correspond to an evolution speed and an evolution direction (e.g., a normal direction of the initial boundary). The evolution speed may be default settings of the system 100, or may be adjustable under different situations. For example, the larger the gradient of the pixel is, the lower the evolution speed may be.

In step 906, the processing engine 112 (e.g., segmentation module 306) (e.g., the processing circuits of the processor 220) may determine a modified boundary based on the level set evolution. During the evolution process, the processing engine 112 may iteratively modify the initial boundary until the gradient of each pixel on the boundary is larger than a gradient threshold, the processing engine 112 may determine the modified boundary.

In the 908, the processing engine 112 (e.g., segmentation module 306) (e.g., the processing circuits of the processor 220) may determine the pixels corresponding to the specific new road based on the modified boundary. The processing engine 112 may further determine pixels corresponding to the one or more new roads in the first intermediate heat map. Further, the processing engine 112 may segment the pixels corresponding to the one or more new roads or eliminate pixels corresponding to the background to obtain the second intermediate heat map.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIGS. 10-A and 10-B are schematic diagrams illustrating exemplary processes for determining pixels corresponding to a new road based on a level set evolution algorithm according to some embodiments of the present disclosure.

As illustrated in FIG. 10-A, the solid dots refer to driving track points along a specific new road. The processing engine 112 may determine an initial boundary A including one or more pixels corresponding to the specific new road. It can be seen that the initial boundary A includes a part of pixels corresponding to the new road. Further, the processing engine 112 may perform a level set evolution on the initial boundary A. As illustrated, each pixel on the initial boundary A may evolve along a direction illustrated by an arrow (i.e., a normal direction of the initial boundary) and the processing engine 112 may determine a modified boundary A until the gradient reaches a gradient threshold.

As illustrated in FIG. 10-B, the processing engine 112 may determine an initial boundary B including the whole pixels corresponding to a specific new road. The processing engine 112 may perform a level set evolution on the initial boundary B. As illustrated, each pixel on the initial boundary B may evolve along a direction illustrated by an arrow (i.e., a normal direction of the initial boundary) and the processing engine 112 may determine a modified boundary B until the gradient reaches a gradient threshold.

For illustration purposes, the present disclosure takes an initial boundary A including a part of pixels corresponding to a new road and an initial boundary B including the whole pixels corresponding to the new road as examples, it should be noted that the processing engine 112 may randomly define a region and determine a boundary of the region as the initial boundary. The initial boundary may include a part of pixels corresponding to the new road and/or a part of pixels corresponding to the background of the heat map.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
   at least one storage medium including a set of instructions for identifying one or more target roads; and
   at least one processor in communication with the at least one storage medium, wherein when executing the set of instructions, the at least one processor is directed to:
      obtain position information associated with a plurality of vehicles through a plurality of positioning devices of the plurality of vehicles in a target region;
      obtain, based on the position information associated with the plurality of vehicles, a heat map associated with a plurality of driving track points of the plurality of vehicles along a plurality of roads in the target region, wherein the plurality of roads includes one or more target roads and one or more reference roads;
      obtain a road network map associated with the one or more reference roads in the target region;
      produce an intermediate heat map by:
         eliminating pixels in the heat map corresponding to the one or more reference roads in the road network map by:
            identifying an intersection between a first group of pixels corresponding to a first group of driving track points and a second group of pixels corresponding to a second group of driving track points in the heat map;
            performing a first elimination of pixels along a first reference line associated with the first group of pixels based on a gradient threshold;
            performing a second elimination of pixels along a second reference line associated with the second group of pixels based on the gradient threshold; and
            determining a target elimination result based on an overlapping result of the first elimination and the second elimination; and
         eliminating background pixels corresponding to background of the heat map; and
         conducting an image thinning operation to the heat map; and
      determine start coordinate information and end coordinate information associated with the one or more target roads based on the intermediate heat map according to a linear transformation.

2. The system of claim 1, wherein to eliminate the pixels in the heat map corresponding to the one or more reference roads in the road network map, the at least one processor is further directed to:
   eliminate a plurality of pixels corresponding to the one or more reference roads in the heat map based on a stroke width transformation (SWT) algorithm.

3. The system of claim 1, wherein to eliminate the pixels in the heat map corresponding to the one or more reference roads in the road network map, the at least one processor is further directed to:

determine a reference line in the heat map along a reference road of the one or more reference roads;

determine an elimination line vertical to the reference line in the heat map; and eliminate pixels along the elimination line based on the gradient threshold.

4. The system of claim 3, wherein the reference line is a center line of the reference road.

5. The system of claim 1, wherein to eliminate the background pixels corresponding to the background of the heat map, the at least one processor is further directed to:

determine an initial boundary corresponding to a target road of the one or more target roads in the intermediate heat map;

perform a level set evolution based on the initial boundary;

determine a modified boundary based on the level set evolution; and determine pixels corresponding to the target road based on the modified boundary.

6. The system of claim 1, wherein the road network map is not associated with the one or more target roads, and the intermediate heat map includes one or more lines corresponding to the one or more target roads.

7. The system of claim 1, wherein the linear transformation includes a Hough transformation.

8. A method implemented on a computing device having at least one processor, at least one storage medium, and a communication platform connected to a network, the method comprising:

obtaining position information associated with a plurality of vehicles through a plurality of positioning devices of the plurality of vehicles in a target region;

obtaining, based on the position information associated with the plurality of vehicles, a heat map associated with a plurality of driving track points of the plurality of vehicles along a plurality of roads in the target region, wherein the plurality of roads includes one or more target roads and one or more reference roads;

obtaining a road network map associated with the one or more reference roads in the target region;

producing an intermediate heat map by:

eliminating pixels in the heat map corresponding to the one or more reference roads in the road network map by:

identifying an intersection between a first group of pixels corresponding to a first group of driving track points and a second group of pixels corresponding to a second group of driving track points in the heat map;

performing a first elimination of pixels along a first reference line associated with the first group of pixels based on a gradient threshold;

performing a second elimination of pixels along a second reference line associated with the second group of pixels based on the gradient threshold; and determining a target elimination result based on an overlapping result of the first elimination and the second elimination; and eliminating background pixels corresponding to background of the heat map; and conducting an image thinning operation to the heat map; and determining start coordinate information and end coordinate information associated with the one or more target roads based on the intermediate heat map according to a linear transformation.

9. The method of claim 8, wherein the eliminating the pixels in the heat map corresponding to the one or more reference roads in the road network map further includes:

eliminating a plurality of pixels corresponding to the one or more reference roads in the heat map based on a stroke width transformation (SWT) algorithm.

10. The method of claim 8, wherein the eliminating the pixels in the heat map corresponding to the one or more reference roads in the road network map further includes:

determining a reference line in the heat map along a reference road of the one or more reference roads;

determining an elimination line vertical to the reference line in the heat map; and eliminating pixels along the elimination line based on the gradient threshold.

11. The method of claim 10, wherein the reference line is a center line of the reference road.

12. The method of claim 8, wherein the eliminating the background pixels corresponding to the background of the heat map further includes:

determining an initial boundary corresponding to a target road of the one or more target roads in the intermediate heat map;

performing a level set evolution based on the initial boundary;

determining a modified boundary based on the level set evolution; and determining pixels corresponding to the target road based on the modified boundary.

13. The method of claim 8, wherein the road network map is not associated with the one or more target roads, and the intermediate heat map includes one or more lines corresponding to the one or more target roads.

14. The method of claim 8, wherein the linear transformation includes a Hough transformation.

15. A non-transitory computer readable medium, comprising a set of instructions for identifying one or more target roads, wherein when executed by at least one processor, the set of instructions directs the at least one processor to perform acts of:

obtaining position information associated with a plurality of vehicles through a plurality of positioning devices of the plurality of vehicles in a target region;

obtaining, based on the position information associated with the plurality of vehicles, a heat map associated with a plurality of driving track points of the plurality of vehicles along a plurality of roads in the target region, wherein the plurality of roads includes one or more target roads and one or more reference roads;

obtaining a road network map associated with the one or more reference roads in the target region;

producing an intermediate heat map by:

eliminating pixels in the heat map corresponding to the one or more reference roads in the road network map by:

identifying an intersection between a first group of pixels corresponding to a first group of driving track points and a second group of pixels corresponding to a second group of driving track points in the heat map;

performing a first elimination of pixels along a first reference line associated with the first group of pixels based on a gradient threshold;

performing a second elimination of pixels along a second reference line associated with the second group of pixels based on the gradient threshold; and determining a target elimination result based on an overlapping result of the first elimination and the second elimination; and eliminating background pixels corresponding to background of the heat map; and conducting an image thinning operation to the heat map; and determining start coordinate information and end coordinate information associated with the one or more target roads based on the intermediate heat map according to a linear transformation.

16. The non-transitory computer readable medium of claim 15, wherein the eliminating the pixels in the heat map corresponding to the one or more reference roads in the road network map further includes:

eliminating a plurality of pixels corresponding to the one or more reference roads in the heat map based on a stroke width transformation (SWT) algorithm.

17. The non-transitory computer readable medium of claim 15, wherein the eliminating the pixels in the heat map corresponding to the one or more reference roads in the road network map further includes:

determine a reference line in the heat map along a reference road of the one or more reference roads;

determine an elimination line vertical to the reference line in the heat map; and eliminate pixels along the elimination line based on the gradient threshold.

18. The non-transitory computer readable medium of claim 17, wherein the reference line is a center line of the reference road.

19. The non-transitory computer readable medium of claim 15, wherein the eliminating the background pixels corresponding to the background of the heat map includes:

determining an initial boundary corresponding to a target road of the one or more target roads in the intermediate heat map;

performing a level set evolution based on the initial boundary;

determining a modified boundary based on the level set evolution; and determining pixels corresponding to the target road based on the modified boundary.

20. The non-transitory computer readable medium of claim 15, wherein the road network map is not associated with the one or more target roads, and the intermediate heat map includes one or more lines corresponding to the one or more target roads.

* * * * *